United States Patent
Lavini (10) Patent No.: US 9,776,691 B2
(45) Date of Patent: Oct. 3, 2017

(54) SHIPS FOR NAVIGATING IN ICY WATERS HAVING IMPROVED PROPULSION PERFORMANCE

(71) Applicant: FINCANTIERI S.p.A., Trieste (IT)

(72) Inventor: Gianpiero Lavini, Trieste (IT)

(73) Assignee: FINCANTIERI S.P.A., Trieste (IT)

( * ) Notice: Subject to any disclaimer, the term of this patent is extended or adjusted under 35 U.S.C. 154(b) by 0 days.

(21) Appl. No.: 15/117,230

(22) PCT Filed: Jan. 14, 2015

(86) PCT No.: PCT/IB2015/050279
§ 371 (c)(1),
(2) Date: Aug. 8, 2016

(87) PCT Pub. No.: WO2015/125033
PCT Pub. Date: Aug. 27, 2015

(65) Prior Publication Data
US 2016/0347424 A1    Dec. 1, 2016

(30) Foreign Application Priority Data

Feb. 18, 2014   (IT) .............................. PD2014A0034

(51) Int. Cl.
| B63B 35/10 | (2006.01) |
| B63B 35/12 | (2006.01) |
| B63B 35/08 | (2006.01) |
| B63B 1/06  | (2006.01) |

(52) U.S. Cl.
CPC ............ *B63B 35/083* (2013.01); *B63B 1/063* (2013.01); *B63B 35/10* (2013.01); *B63B 35/12* (2013.01); *Y02T 70/126* (2013.01)

(58) Field of Classification Search
CPC ....... B63B 35/00; B63B 35/08; B63B 35/083; B63B 35/10; B63B 35/12
USPC ............................................... 114/40, 41, 42
See application file for complete search history.

(56) References Cited

U.S. PATENT DOCUMENTS

| 993,440 A | * | 5/1911 | Duplessis ............... B63B 35/08 |
| | | | 114/41 |
| 3,521,590 A | | 7/1970 | German et al. |
| 4,436,046 A | * | 3/1984 | Braley .................... B63B 35/12 |
| | | | 114/40 |

FOREIGN PATENT DOCUMENTS

| DE | 2753540 A1 | 6/1979 |
| GB | 1555437 A  | 11/1979 |
| WO | 2010087717 A2 | 8/2010 |

* cited by examiner

*Primary Examiner* — Lars A Olson
(74) *Attorney, Agent, or Firm* — Robert E. Alderson, Jr.

(57) ABSTRACT

Ships for navigating in icy waters having improved propulsion performance in open water and at the same time good maneuverability forward in icy waters are provided. Such ships include those having a bow area with a bulb adapted to generate a bow wave in phase opposition with respect to that generated by the ship's hull.

19 Claims, 13 Drawing Sheets

SHIPS FOR NAVIGATING IN ICY WATERS HAVING IMPROVED PROPULSION PERFORMANCE

CROSS-REFERENCE TO RELATED APPLICATIONS

This application is a National Phase Application of PCT International Application No. PCT/IB2015/050279, International Filing Date, Jan. 14, 2015, claiming priority to Italian Patent Application No. PD2014A000034 (102014902234550), filed Feb. 18, 2014, each of which is hereby incorporated by reference in its entirety.

FIELD OF THE INVENTION

The present invention relates to a ship for navigating in icy waters having improved propulsion performances.

In particular, the ship according to the invention may be a container ship, a RO-RO, a ferry, a service ship for drilling platforms, a fishing vessel, etc.

BACKGROUND OF THE INVENTION

All modern ships are equipped at the bow with voluminous Delta bulbs adapted to reduce resistance to their advancement.

The Delta bulb is a system for generating a bow wave in phase opposition to that generated by the ship in such a way that the resulting wave is as small as possible. The reduction in height of the ship wave makes it possible to greatly reduce the resistance to its advancement.

Delta bulbs must therefore create a wave of a comparable size to that of the ship. To be effective a Delta bulb must have a considerable volume and very full and rounded shape of the front at the waterline.

A large Delta bulb suitable to generate a wave able to lower that generated by the ship has a geometry which behaves very well in ice-free waters, but which is entirely unsuitable for navigation in icy waters.

A Delta bulb has, in fact, an almost completely flat front surface which does not permit the crushing of the icy surface and thus the navigation through ice. Even if the ship has a powerful propulsion system the flat surface of the Delta bulb arranged near the waterline would hit the ice with a very extensive area, and thus with a very low specific pressure, which does not permit breaking of the ice. In addition, in the bow area there would be an ice build-up which would gradually block the advancement of the ship.

The Delta bulb cannot therefore be used when a ship also needs to operate in icy waters.

As a result, in ships intended for navigation in icy waters, the need to ensure adequate manoeuvrability has led to a sacrifice of propulsive performance in open water, forgoing the Delta bulb.

A widespread solution on ships intended for navigation in icy waters provides for the use of icebreaker bulbs. These bulbs have a sharp form ideal for breaking ice, but unable to offer comparable hydrodynamic performances to those of a Delta bulb.

In the U.S. Pat. No. 3,521,590 it has been proposed to adapt the forms of a traditional bow bulb for navigation in open water so as to make it suitable for crushing ice. Traditionally bow bulbs for navigation in open water have a slightly flattened cross-section in a vertical or circular direction. In U.S. Pat. No. 3,521,590 it is proposed to flatten the bulb in a horizontal direction. Considering a transversal cross-section, the bulb should have a greater extension in width than the extension in height. It is proposed, in addition, to add a blade which extends along the front profile of the bulb from the tip of the bulb as far as the stem bow which it connects to. The bulb is also modified so as to have a V-shape suitable to divert the crushed ice along the sides of the ship in order to push it to the sides of the ship instead to under the hull.

The proposal of U.S. Pat. No. 3,521,590 is a compromise solution, which requires a sacrifice in terms of open water hydrodynamic performances. The bulb shapes have in fact been changed significantly, away from the best shapes for ensuring the desired hydrodynamic effects. As regards navigation in icy waters the solution proposed in U.S. Pat. No. 3,521,590 solution does not appear to be particularly high performance. In fact, the deviation of the crushed ice along the sides may result in an excessive build-up of ice on the sides in many operational situations. The result is a slowing of the movement of the ship and in some extreme cases, its blockage.

The need continues to be deeply felt therefore in the industry of ship intended for navigation in icy waters to offer high propulsive performance in open water, but without sacrificing adequate manoeuvrability in icy waters.

SUMMARY OF THE INVENTION

Consequently, the purpose of the present invention is to eliminate or at least attenuate the drawbacks of the prior art mentioned above, by providing a ship for navigation in icy waters, which offers high propulsive performance in open water and at the same time good manoeuvrability forward in icy waters.

A further purpose of the present invention is to make available a ship for navigating in icy waters which is operatively reliable.

A further purpose of the present invention is to provide a ship for navigating in icy waters, which ensures the aforesaid benefits without being significantly more expensive than similar conventional ships.

Characteristics of the invention can be seen clearly from the detailed description below made with reference to the attached drawings, describing embodiments of the invention by way of non-limiting examples.

DETAILED DESCRIPTION

With reference to the appended drawings, reference numeral 1 globally denotes a ship for navigating in icy waters according to the invention.

Reference will be made herein to a ship 1 in conditions of use. References to an upper or lower position or horizontal or vertical direction therefore should be understood in this sense.

According to a general embodiment of the invention, the ship for navigating in icy waters is provided in the bow area 2 with a bulb 10 of the type adapted to generate a bow wave in phase opposition with respect to that generated by the ship's hull in such a way that the resulting wave is as small as possible, thus reducing the resistance to advancement.

Preferably, the bulb 10 is a bulb defined in the jargon as a "Delta" bulb, i.e. a type of bulb that has most of its volume at the waterline.

In particular, with respect to vertical cross-section planes transversal to the extension in length of the bulb, the Delta bulb 10 has transversal cross-sections with an inverted drop shape.

Advantageously, the width of a Delta-bulb is a function of the size of the ship: the greater the displacement of the vessel, the greater the volume of the bulb must be.

Preferably, the Delta bulb 10 has a maximum transversal width on a vertical plane of about 12-15% of the width of the ship.

In particular, the maximum transversal width of the Delta bulb 10 is located at about ⅕ of the height of the bulb from the upper edge thereof.

Advantageously, the Delta bulb 10 has a transversal section of maximum area located at a distance equal to about ⅓ of the length of the bulb from the point more to the fore of the longitudinal profile of said bulb. The bulb 10 has a length of between 4.0 and 4.4 percent of the length of the ship.

In particular, the Delta bulb 10 has a volume equal to about 0.5% of the total volume of the hull.

Advantageously, as general design parameters, for a Delta bulb the maximum width is about 12-15% of the ship width, its volume is about 0.5% of the total volume of the hull and its length is between 4% and 4.4% of the ship's length. The transversal section of maximum area is located at a distance equal to about ⅓ of the length of the bulb from the point more to the fore of the longitudinal profile of the bulb itself. This section has its maximum width at about ⅕ of its height from the upper edge thereof. The waterlines of the bulb in the bow part have a semi-elliptical form and present at the cross-section of the ship's forward perpendicular a characteristic inflection to connect with the hull water lines.

Figure 1:
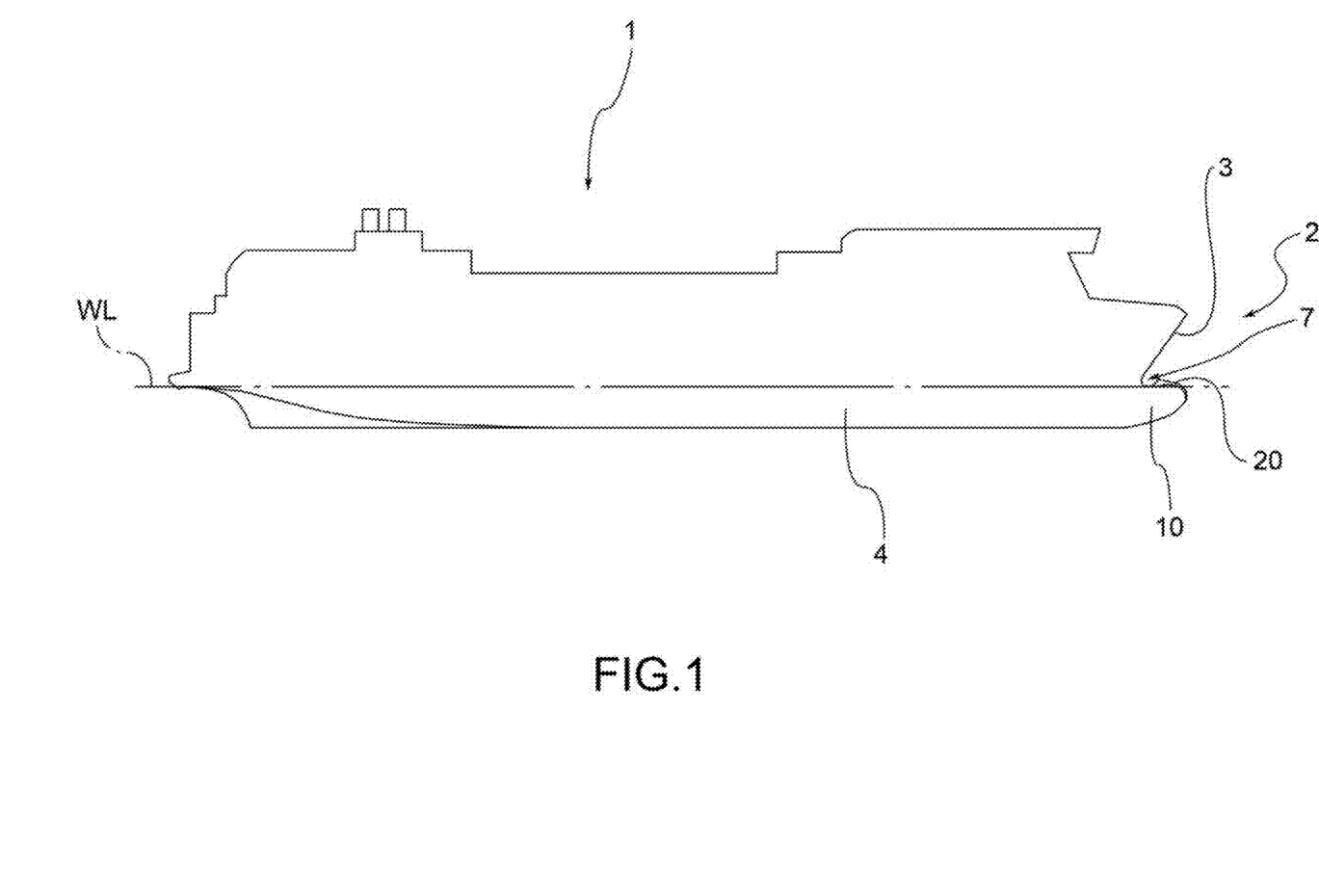
FIG. 1 shows a schematic view of the side of a ship according to a first embodiment of the present invention.
Figure 2:
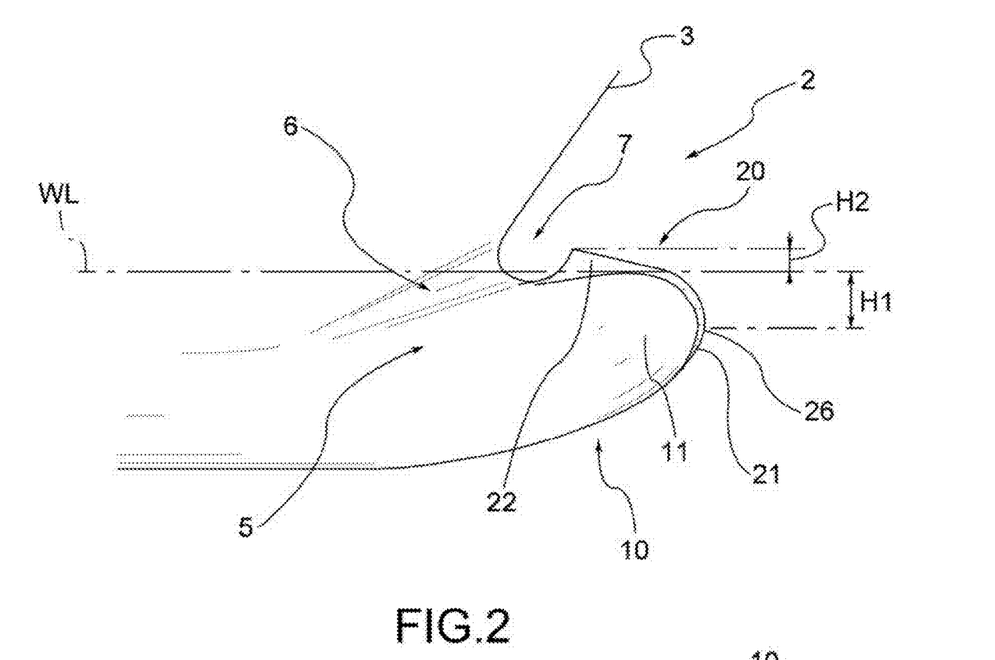
FIG. 2 shows a side view of a detail of the bow area of the ship in FIG. 1, FIGS. 3, 4 and 5 show an orthogonal view from above, a perspective view from above and a front orthogonal view of the detail in FIG. 2.
Figure 7:
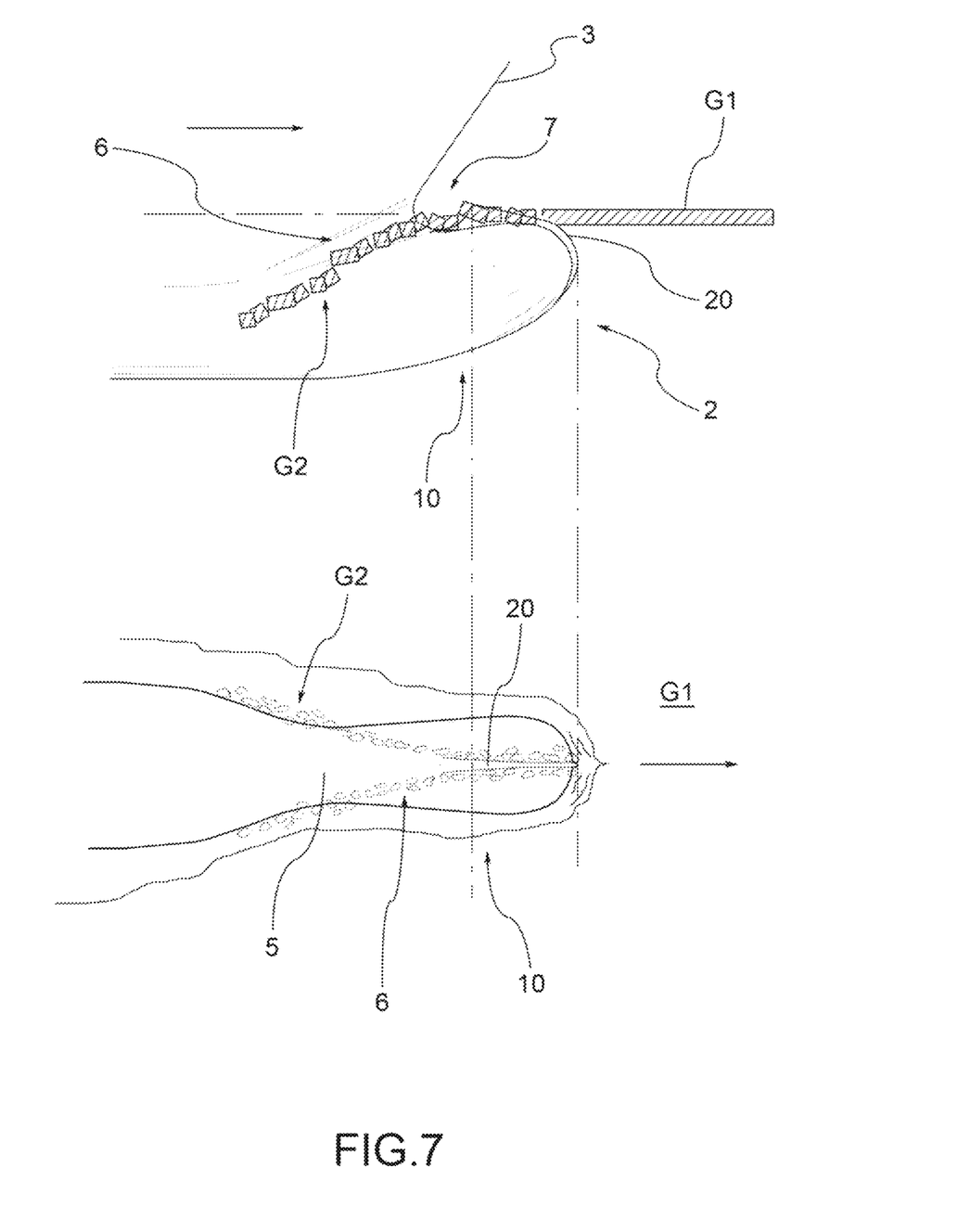
FIG. 7 illustrates in a lateral orthogonal view and a view from above the movement of the crushed ice in the bow area of a ship according to the invention.
Figure 11:
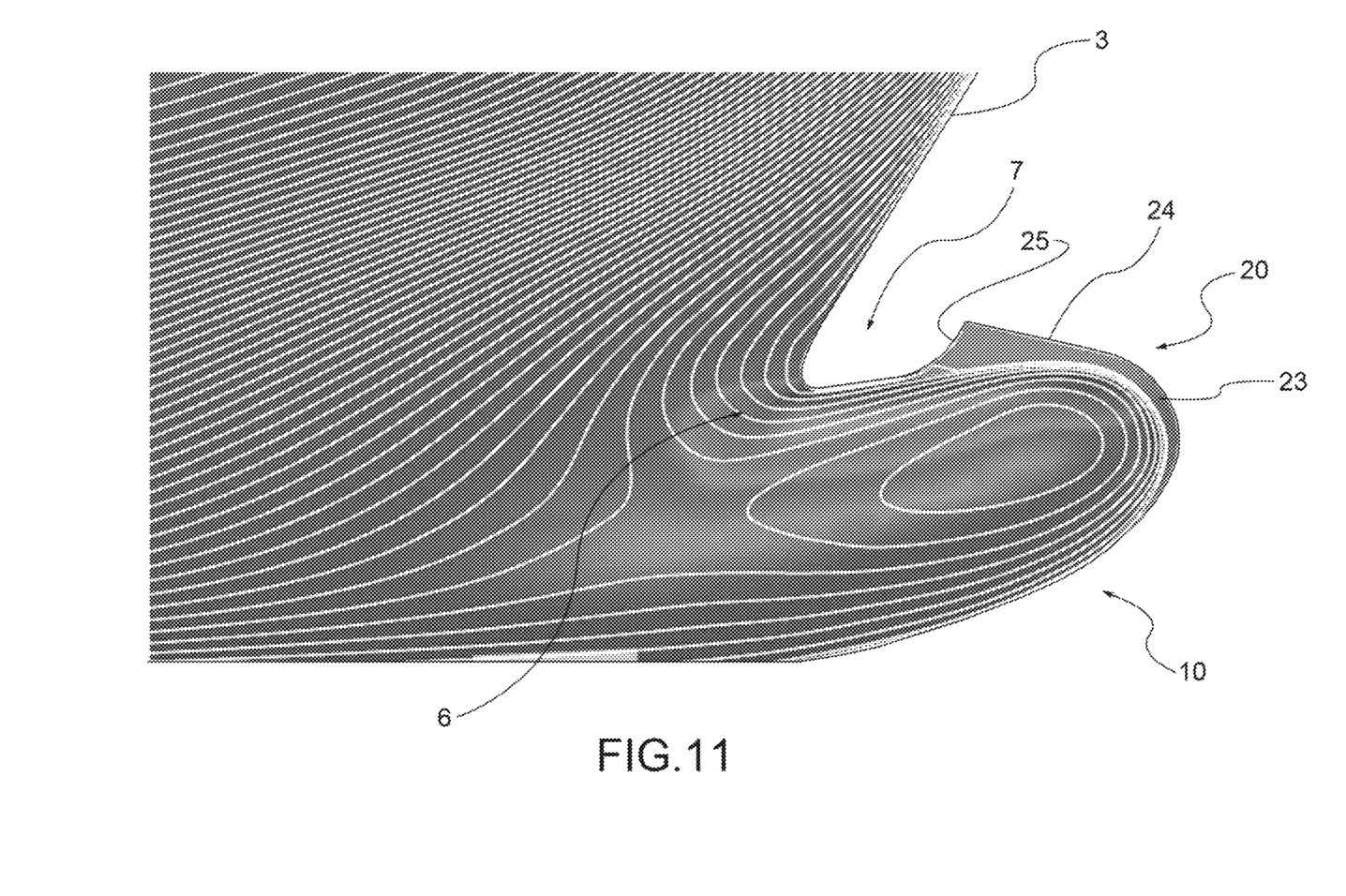
FIG. 11 shows a lateral perspective view of the detail in FIG. 2.

According to the aforesaid general embodiment, as shown in particular in FIGS. 2, 7 and 11, the bulb 10 is connected to the ship's hull 4 by a connecting portion 5 which defines a groove 6 inclined downwards towards the stern to preferentially convey the water under the hull.

Advantageously, the shapes of the bulb 10 are related to the shapes of the hull with the best possible direction. To make this connection various solutions can be adopted. Preferably the connecting portion 5 is of the goose neck type, as shown in the appended drawings.

More specifically, the bulb shapes connect with those of the hull forming astern of the bulb 10 in the intersection or connecting portion 5 a groove or goose neck that takes on the characteristic shape of a groove or inclined channel on the hull.

Preferably the aforesaid groove 6 is inclined downwards towards the stern with respect to the waterline (WL) with an angle between 10° and 25°.

In particular, the incline is a function of the speed: the faster the ship the less inclined the goose neck must be.

The goose neck with relative groove has the effect of conveying under the hull the water raised by the bulb 10 reducing the wave at the bow. In fact, the water is raised by the bulb creating a wave, but is then conducted through the goose neck below the hull. The goose neck thus creates a preferential channel along which the water runs. The water, conveyed into the goose neck, accelerates, creating a depression. This depression has the effect of lowering the wave formed on the bow of the ship, as a result reducing the resistance of the ship. The goose neck thus works as a suction funnel of the water raised by the bulb to convey it under the hull.

According to the invention the ship 1 comprises a rib 20 which frontally protrudes from the bulb 10 on the vertical centreline plane of the bulb and extends from the front end 11 of the bulb to the aforesaid connecting portion 5.

The rib 20 has at least one front portion 21 arranged below the waterline WL of the ship so that, in the case of forward movement in icy waters, the rib 20 engages with such front portion 21 the ice from below and due to the forward motion of the ship progressively lifts it upwards above the bulb while simultaneously causing the breakage of the ice by flexing.

The front portion of the rib 21 extends below the waterline WL to a depth H predefined according to the maximum thickness of crushable ice.

As described further below, it is essential for at least a part of the rib to extend below the waterline to a depth greater than the thickness of the ice to be crushed. The thicker the ice the deeper the rib must be immersed. The depth value H1 is a parameter to choose at the design stage depending on the maximum thickness of ice which the ship must be able to cope with.

According to the invention, the rib 20 connects to the connecting portion 5 at the fore of the groove 6 without joining with the stem 3 so as to leave a passage channel 7 free between one side and the other of the bulb at the aforesaid groove 6. Operationally, the rib 20 therefore guides the ice crushed by it up to the passage channel 7 between said rib and the stem in such a way that the crushed ice is sucked into the groove and conveyed under the hull.

Thanks to the invention, and in particular thanks to the fact that the rib does not connect to the stem defining the aforesaid passage channel 7, the groove 6 present in the connecting portion 5 can serve not only to suck down the wave generated by the bulb, but also to bring the ice crushed by the rib 20 under the ship's hull, preventing it from accumulating on the bow of the ship.

In the absence of such configuration, the crushed ice would tend to flow by purely horizontal motion and would impact against the hull at the waterline forming build-ups. In particular on account of the preferred drop shape of the cross-sections of the bulb, the blocks of crushed ice would not easily flow under the hull but move parallel to the water lines, possibly generating build up phenomena and thus hindering the forward movement. In the absence of the aforementioned rib shape with passage channel 7, the ice would therefore be crushed, but could not easily be dragged under the hull allowing the ice to slide freely along the hull without causing build-up on the bow and thus resistance to advancement. It is to be noted that ice does not generate resistance only when it needs to be broken, but also when it accumulates and cannot flow freely along the hull.

The more the ice flows under the hull the less resistance it poses. The bow bulb 10 with rib 20 according to the invention not only crushes the ice, but makes the crushed blocks of ice flow not onto the ship's bow, but where it cannot accumulate, i.e. under the hull where it can flow freely without generating particular resistance. The area under the hull is, in fact, an area of water completely ice free. The blocks at some point in the stern area will tend to re-emerge given their lesser specific weight. This behaviour enables the propellers not to hit them.

Figure 3:
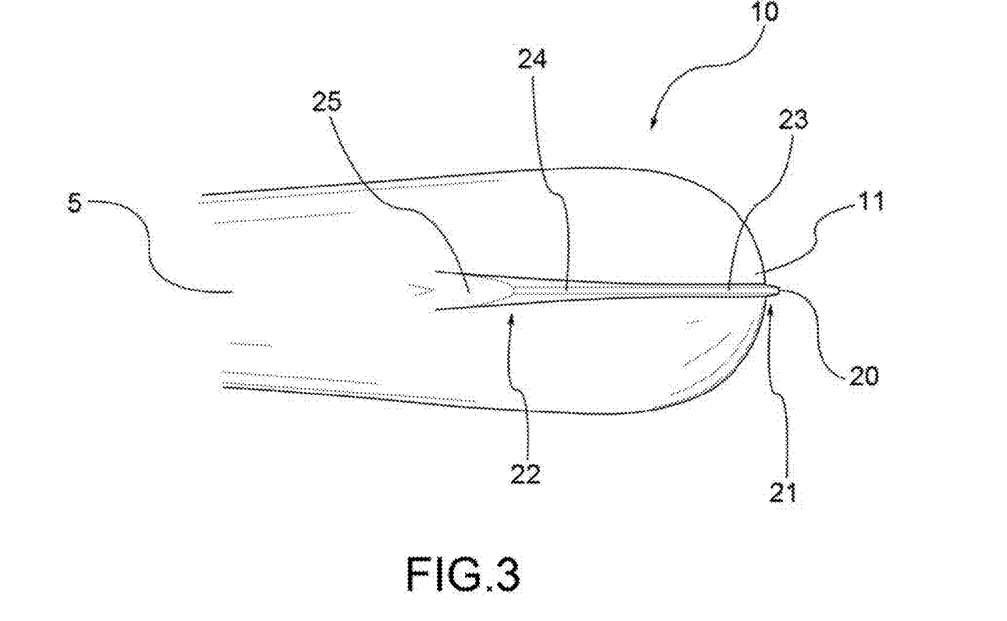
Figure 4:
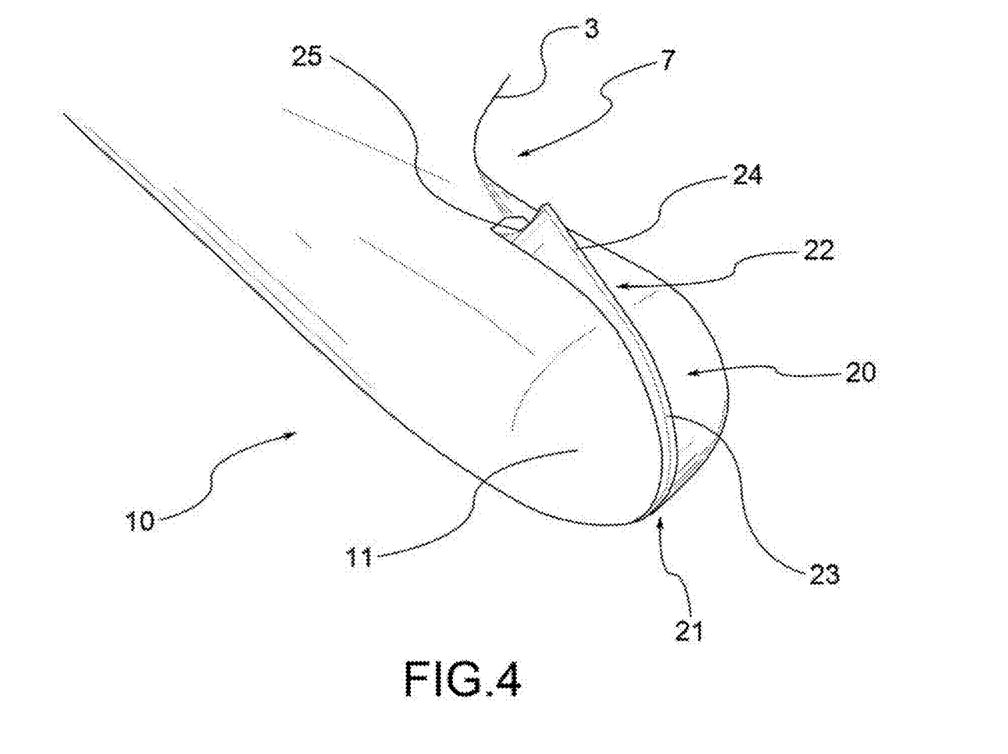
Figure 5:
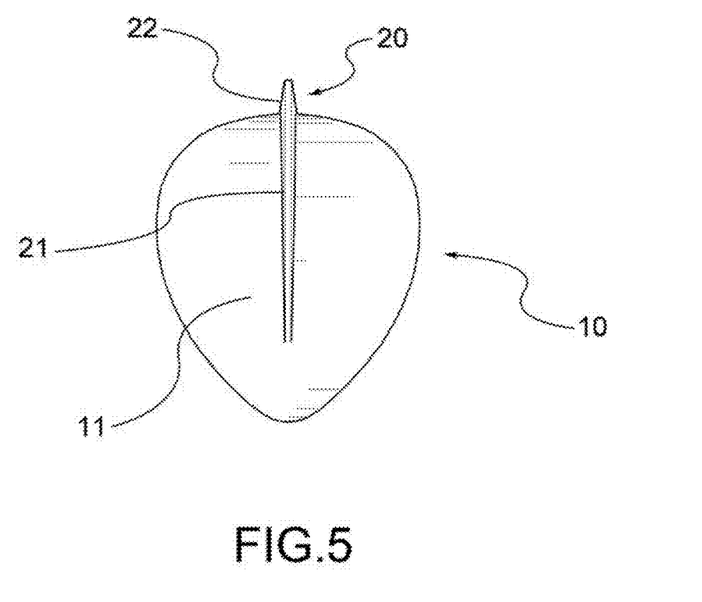

Preferably, as shown in particular in FIG. 3, the rib 20 has a transversal cross-section that tapers from the connection base to the bulb towards its peak. The rib thus has a wedge shape that generates high tensions more easily in the ice, which then trigger its crushing.

Advantageously, to reduce wear and deformation of the rib 20 due to impact with the ice, the rib 20 has a squat shape with a flattened end edge. A sharp blade rib may be provided for. Such a solution would, however, be operationally unreliable since in a short time the impact with the ice would deform the rib, bending it to one side and making it unusable.

According to the embodiment illustrated in the appended drawings, the rib 20 has a trapezoid-shaped cross-section, with the largest side at the bulb connection area and the smallest at the peak (free edge) of the rib.

Preferably, as shown in particular in the drawings, at the front end 11 of the bulb, the rib 20 has a concave curvilinear outer profile 23 on the vertical centreline plane of the bulb 10.

In particular, on the vertical centreline plane of the bulb 10, the rib has at least one part with a concave curvilinear profile 23 at least at the front portion 21 of said rib arranged below the waterline WL.

In particular, the depth H1 to which the front portion 21 of the rib extends below the waterline WL is between 2.0 and 3.0 m depending on the thickness of ice to break and on the size of the ship.

Preferably, the extension in depth H1 effective for crushing the ice is calculated between the waterline WL and the inflection point 26 of the curved concave profile of the front portion 21 of the rib. In other words, the effective portion of the rib below the waterline is that which has an upward inclination.

The curvature of the rib permits easy lifting of the ice significantly reducing the resistance to motion in the ice.

Advantageously, due to the curved concave profile the angle of incidence of the rib against the ice is not constant, but varies gradually as the rib moves under the ice lifting it.

Firstly, this minimises the surface of first impact of the rib against the ice, determining for the same thrust an increase of specific pressure and thus favouring the breaking of the ice. Secondly, due to the curvature the ice tends to slide along the rib, thereby lessening the effect of breaking by compression and favouring, instead, the effect of breaking by flexing (due to the raising of the ice and to the thrust from the bottom upwards impressed by the rib). Lastly, the curvature of the rib makes the ice adopt a progressively decreasing inclination during the lifting action. This way, the ice is lifted only for the time needed to determine a flexural fracture, without lifting it excessively, as instead would have happened if the rib had a straight outer profile.

The conformation of the rib 10 according to the preferred embodiment described above and illustrated in the appended drawings differs from what was proposed in the aforementioned U.S. Pat. No. 3,521,590. Said patent in fact describes an icebreaker rostrum with a substantially straight outer contour and thus having a constant angle of incidence with the icy surface. With this configuration the rostrum collides against the icy surface crushing it mainly by compression and only partially by flexing (due to lifting).

As is known, ice is resistant to compression, while it is fragile to flexing. Consequently, having a constant inclination angle the raising of the icy surface and its crushing by flexing are not carried out effectively. The concave curvature conformation of the rib 20 as described above instead facilitates more efficient breaking by flexing. Due to its curved shape the rib penetrates under the icy surface, triggers the crushing with an upward impact and with its variable inclination simultaneously generates both the raising of the icy surface and its crushing by flexing, exploiting the fragility of the ice to flexing stress. The bulb with rib according to the invention, acts therefore as a kind of "can opener" in which the blade (i.e. the rib) is not simply dragged in a rectilinear motion clashing against the icy surface with a constant angle of incidence and thus largely ineffective, but with its curvature penetrates beneath the ice, lifts it, easily crushing it with a flexural action to which the ice poses little resistance.

Figure 13:
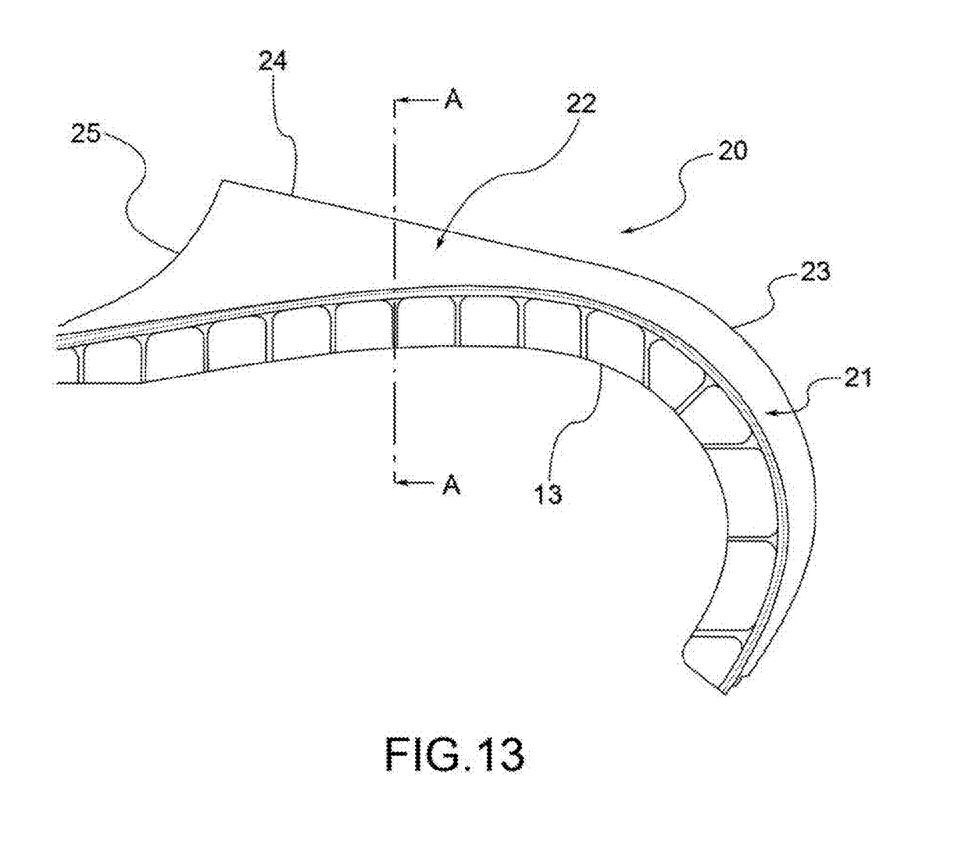
FIG. 13 shows a cross-section view of a detail of a bow bulb with protruding rib according to an embodiment of the present invention, the cross-section being made on a vertical plane passing near the centreline of the bulb.

Advantageously, as shown in particular in FIGS. 2, 11 and 13 the rib height decreases gradually as it gets closer to the front end of the rib, i.e. towards the bottom of the bulb. The front portion 21 of the rib is joined to the bulb without interruption in its end portion so as not to affect the hydrodynamic behaviour of the bulb.

Advantageously, the rib 20 extends above the waterline WL with a rear portion 22.

Preferably, the rib 20 extends in height above the waterline WL in a limited manner, to a height sufficient to complete the flexural fracture of the ice, so as to interfere as little as possible with the bulb's hydrodynamic behaviour.

In particular, the height H2 to which the rear portion 22 of the rib extends above the waterline WL is between 0.8 to 1.2 m.

Advantageously, as shown in the appended drawings, on the vertical centreline plane of the bulb, the rib 20 may have at least one part with a rectilinear outer profile 24 at the aforesaid rear portion 22 arranged above the waterline WL.

In particular, the aforesaid part with a rectilinear outer profile 24 of the rear portion 22 of the rib 20 is uninterruptedly connected to the part with the concave curvilinear profile 23 of the front portion 21.

In particular, on the vertical centreline plane of the bulb, the rib 20 may connect to the connecting portion 5 with a part having a convex curved outer profile 25. Said convex curved part 25 delimits a part of the channel passage 7 between the two sides of the bulb. The curved shape reduces the interference on the flow lines in the passage channel.

According to the embodiment illustrated in particular in FIGS. 2 and 13, the icebreaker rib 20 thus has a characteristic scimitar-shape with a transversal cross-section in the shape of a trapezoid.

In general the sizes of the rib 20 are chosen according to the thickness of the icy crust to be broken and to the sizes of the vessel and are such as not to interfere with the hydrodynamic behaviour of the bulb in water free from ice avoiding increases in resistance to the progress of the vessel.

Figure 12:
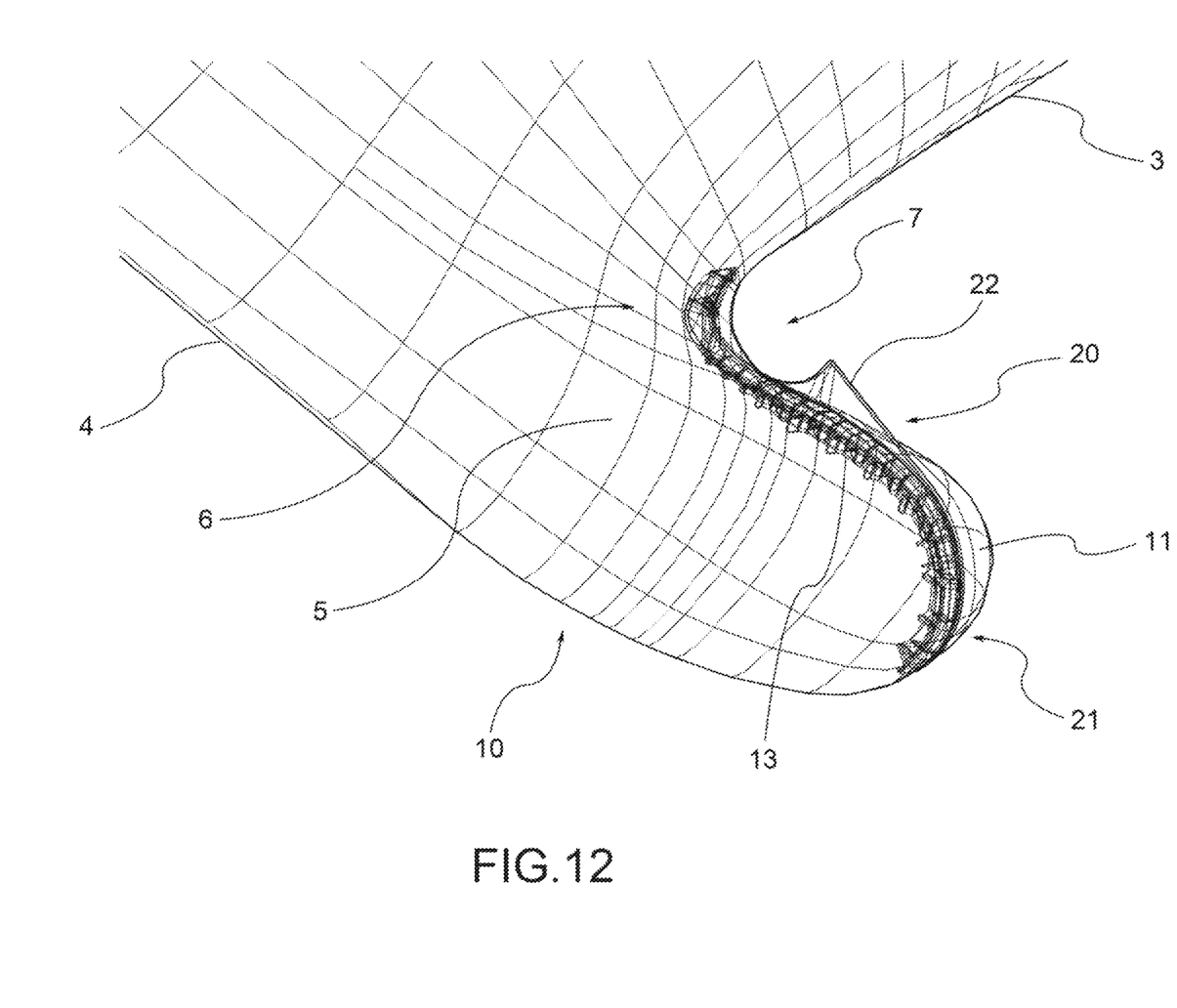
FIG. 12 shows a constructive perspective view of the detail in FIG. 2 with some parts in transparency.
Figure 14:
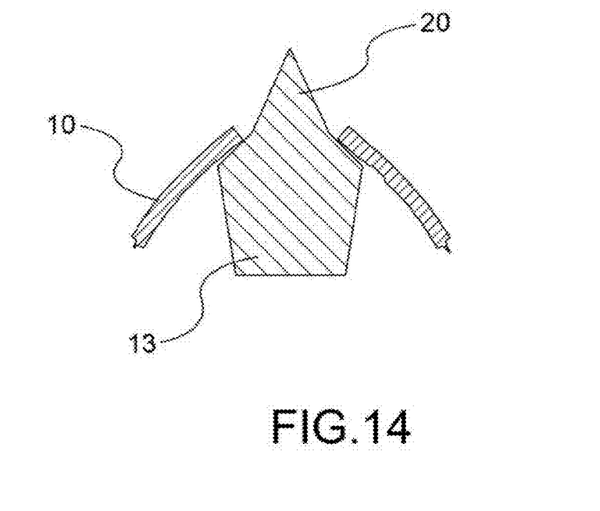
FIG. 14 shows a transversal cross-section view of the detail in FIG. 13.
Figure 15:
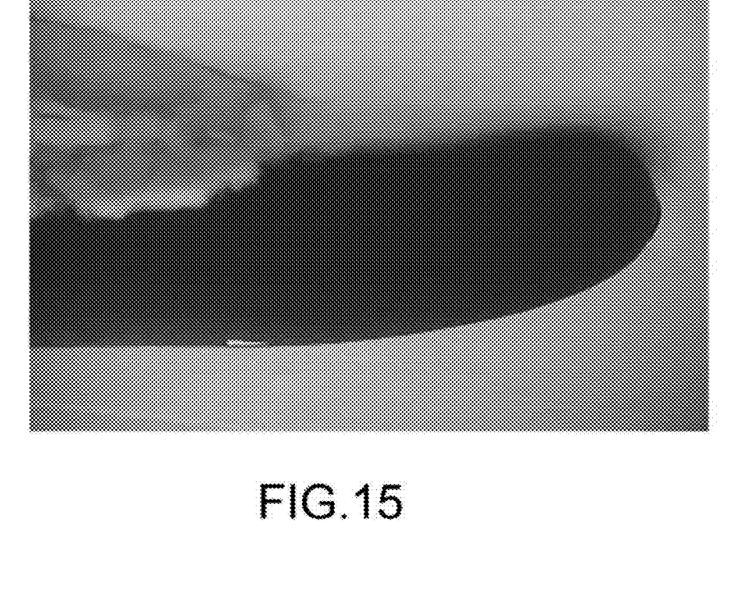
FIGS. 15 to 22 showed a series of photographs of a test ship made according to the invention taken from the bottom of the test tank during crushing tests of level type ice.
Figure 16:
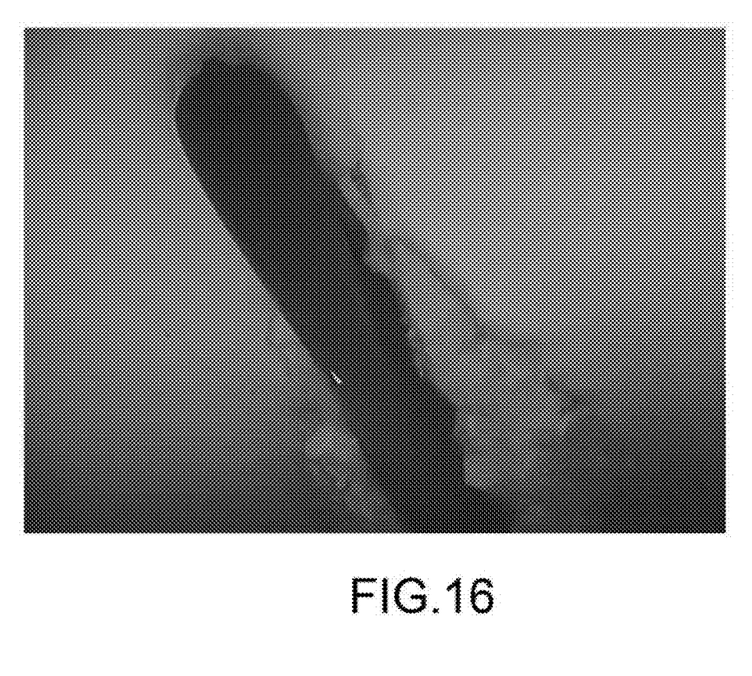
Figure 17:
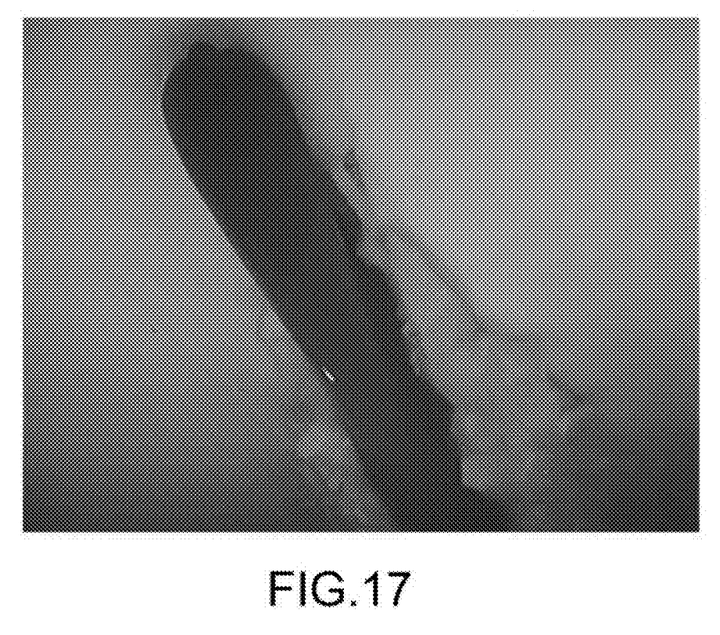
Figure 18:
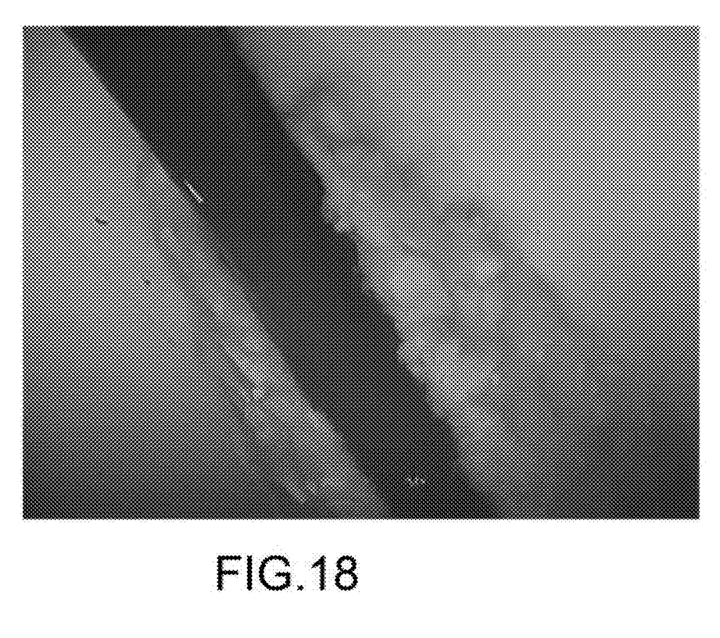
Figure 19:
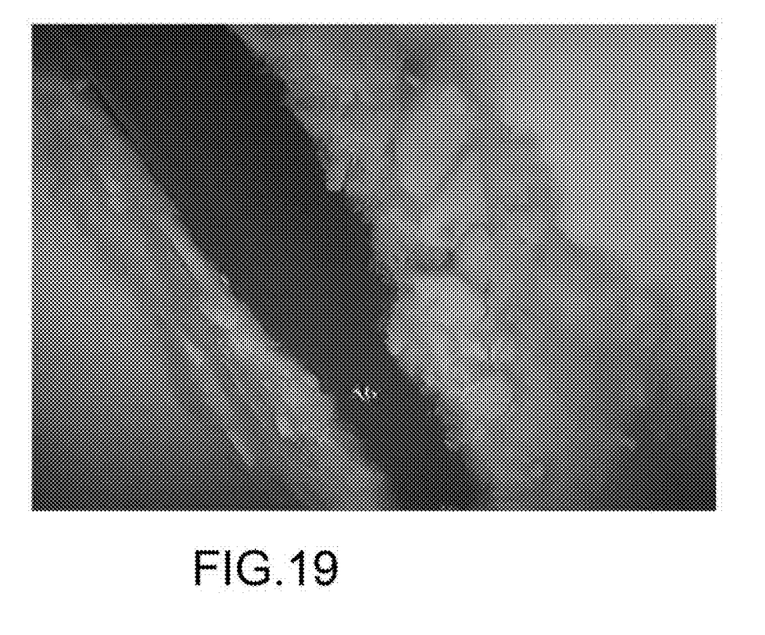
Figure 20:
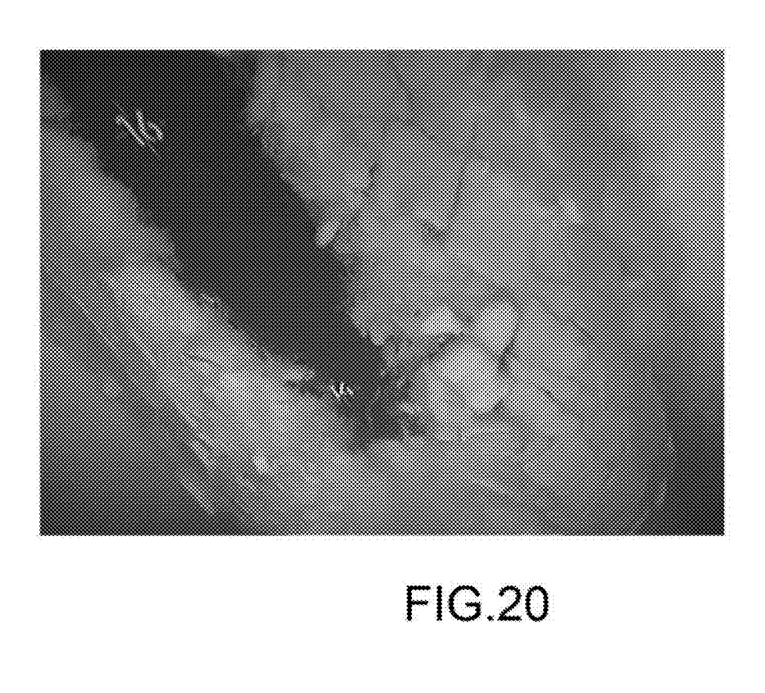
Figure 21:
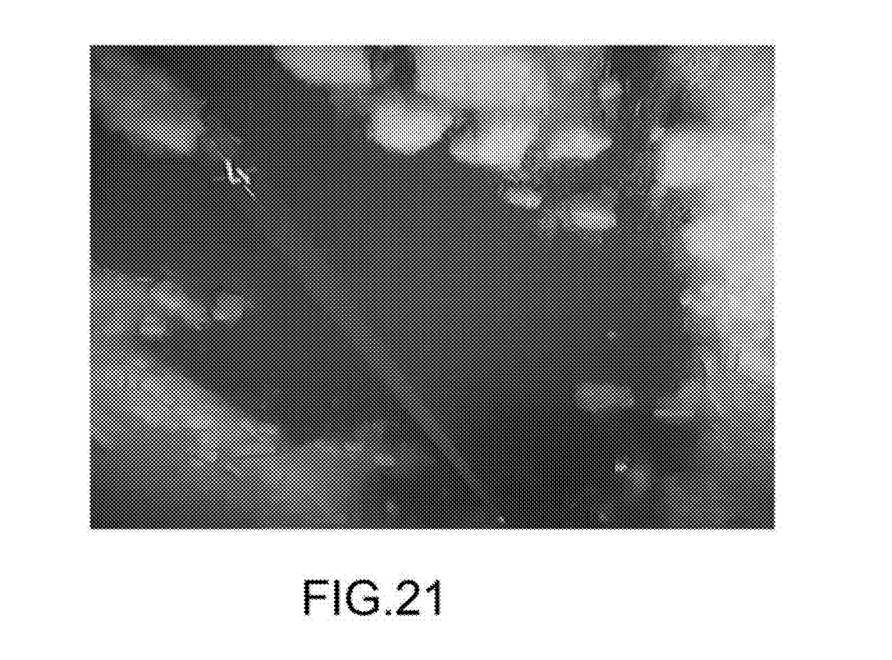
Figure 22:
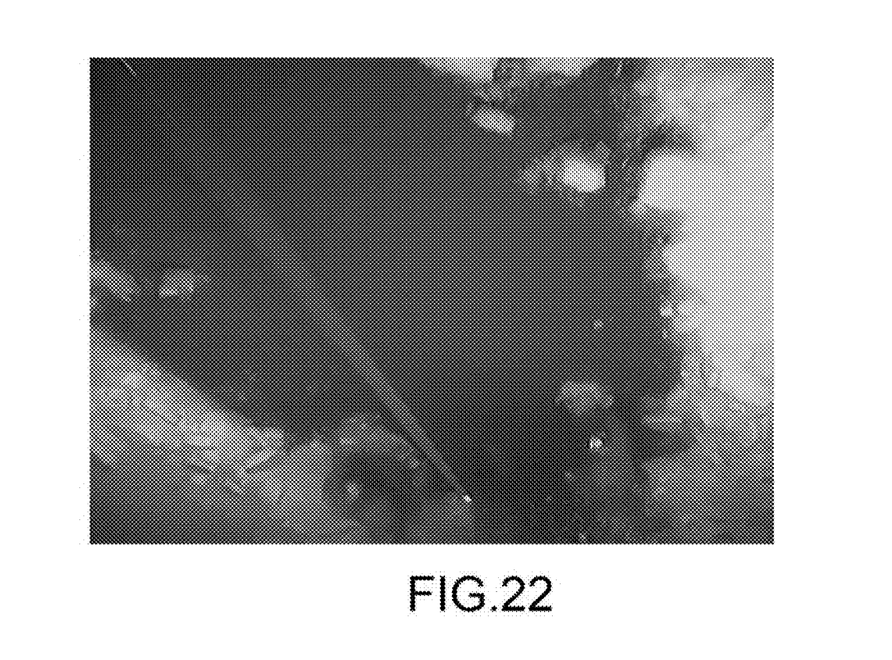

Advantageously, the bulb and the rib have structural configurations sized to withstand shocks with the icy surface. In particular, the rib may consist of one piece made by casting. In particular, as shown in FIGS. 12, and 14, the bulb 10 is provided along its front profile with an internal reinforcement element 13 at which the protruding rib 20 is joined, in particular consisting of a single cast piece. Preferably the dimensioning of the bulb and the rib is made in compliance with the prescribed standards for ice class registers.

As already mentioned earlier, the breaking of the ice occurs by upward flexural crushing. In the forward motion the bulb 10 with rib 20 according to the invention enables the ship to crush the ice from below, to hack it, lift it and break it by flexing. In particular the concave curved profile of the rib allows the ship not to clash directly against the ice, but instead to break it by flexing it from below. At least a part of the rib must necessarily be immersed to a greater depth than the thickness of the ice. Once the icy surface is touched, due to its wedge shape the rib crushes the ice using the lifting and flexing generated by the motion of the ship.

Figure 8:
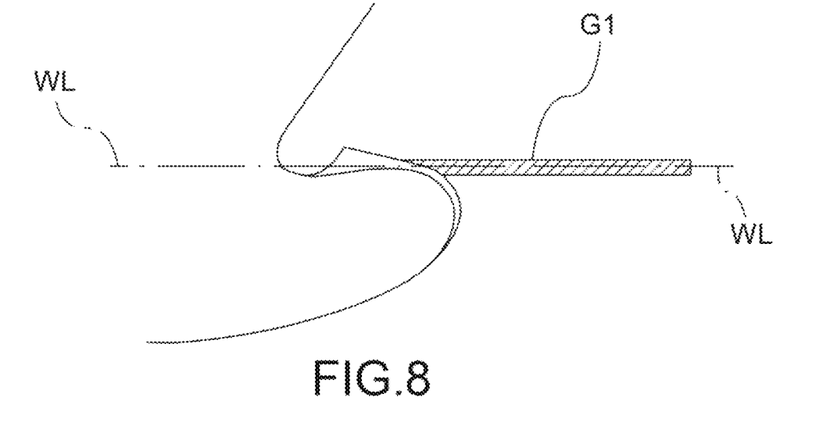
FIGS. 8 to 10 shows the sequence of advancement in icy waters in forward movement of a ship according to the present invention.
Figure 9:
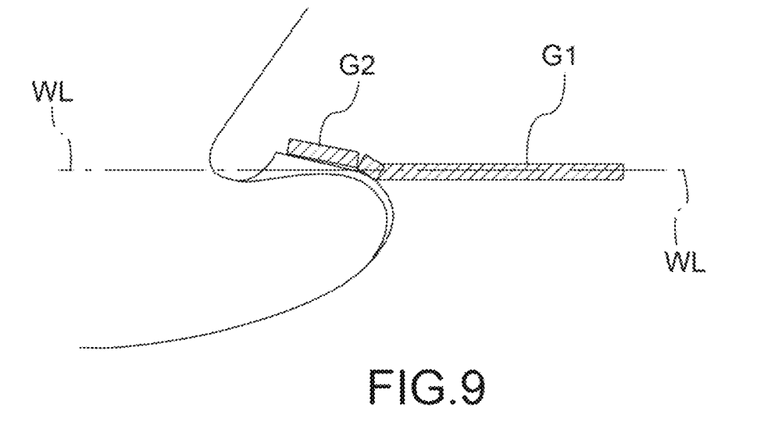
Figure 10:
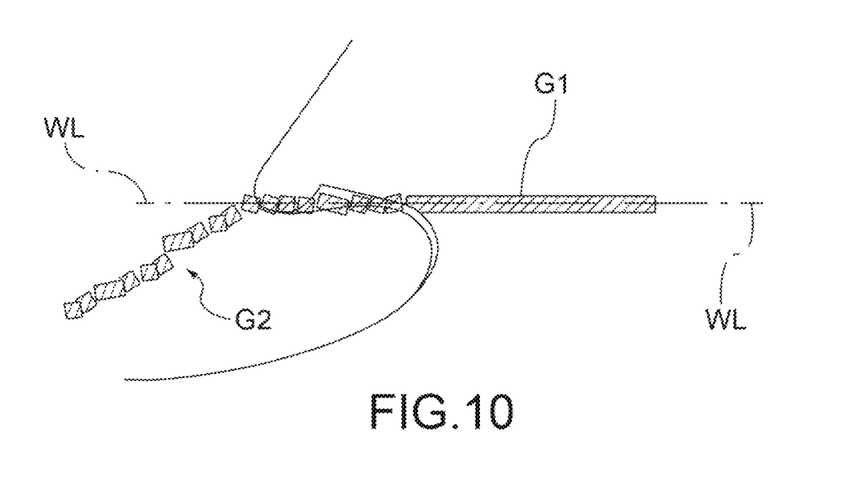

The ice crushing sequence is shown in FIGS. 8, 9 and 10, where the ice layer—shown schematically—is indicated as G1, and the crushed ice as G2:

contact with the ice at the front portion 21 of the rib (FIG. 8);
lifting and breaking by flexing of the icy surface of the ice (FIG. 9); and
sucking of the blocks of crushed ice under the hull (FIG. 10).

Advantageously, the crushing takes place continuously without the need for alternate ramming movements firstly in the forward direction to free the ship from the blockage and then accelerating forward. This feature facilitates movement in the ice and prevents the ship from remaining blocked, since the bulb with the icebreaker rib acts as a sort of "can opener" on the icy surface. According to the invention the friability of ice to flexing is exploited. The first crushing action takes place thanks to the small dimensions of the rib (preferably with a wedge shape) that generate very high tensions in the ice which trigger its breakup.

Tests conducted in an ice tank on a ship according to the invention (i.e. with the bulb 10 with icebreaker rib 20) showed an excellent ability to fracture level ice with a thickness of more than 0.5 meters. Level ice is the most resistant type of ice, compact, never broken before and without fracture triggering lines.

The test ship also managed to break in an extremely effective manner barriers of ridge ice of about 7 meters thick, without requiring alternate back and forth movements. Ridge ice is a type of ice built up by the wind and sea currents, neither consistent nor compact, forming deposits below the surface of deep water of up to 5 meters and more.

Therefore, even in conditions of very thick ice the ship is able to manoeuvre without running the risk of being blocked.

The results of tests carried out in an ice tank with a test ship provided with a bow bulb with rib according to the present invention are given below. Table 1 below shows the main characteristics of the ship used in the tests.

TABLE 1

| | |
|---|---|
| Length between perpendiculars | 120 m |
| Width | 22.4 m |
| Immersion | 5.5 m |
| Displacement | 9,800 t |
| Installed power | 14,000 kW |

The aforesaid test ship had a Delta bulb with the following dimensions. Length 5 m, width 3.2 m and immersion 5.4 m. According to the invention the bulb had an icebreaker rib of 6.7 m in length. In particular the rib extended below the waterline to a depth $H_1$ of 2.5 m (calculated at the inflection point of the curvature of rib) and above said line for a height $H_2$ of 1 m.

Tables 2, 3 and 4 show the power values required in conditions of forward movement for the above test ship respectively in terms of level ice, ridge ice and brash ice.

TABLE 2

| Average height level ice [m] | Ice flexural strength [kPa] | Average speed [knots] | Average thrust [kN] | Power [kW] |
|---|---|---|---|---|
| 0.5 | 907.89 | 5.00 | 1016.55 | 7718.3 |
| 0.5 | 718.86 | 3.00 | 781.86 | 5326.1 |

TABLE 3

| average ridge ice thickness [m] | ridge ice width [m] | attempts [—] | Average speed [knots] | Average thrust [kN] | Power [MW] |
|---|---|---|---|---|---|
| 1.75 | 24 | 1 | 5.3 | 1128 | 11.7 |

TABLE 4

| Average height brash ice [m] | Ice flexural strength [kPa] | Average speed [knots] | Average thrust [kN] | Power [kW] |
|---|---|---|---|---|
| 1.48 | 525.21 | 5.00 | 580.51 | 3987.3 |
| 1.32 | 457.11 | 5.00 | 505.40 | 3333.6 |

The results of the tests shown in table 2 show the ability of the ship to move continuously with level ice (the hardest and most difficult to crush) of 0.5 meters at a speed of 5 knots which is a particularly high value, confirming the quality of the solution according to the invention.

The results of the tests shown in table 3 demonstrate the ability of the ship to move continuously with ridge ice with an average height of 1.75, equal to a maximum height of 5 meters, at a maximum speed of 5.3 knots. The ship needed only one attempt to break the barrier. Ridge ice tests show that crushing with the bulb with rib according to the invention is always at a single stroke (one attempt) therefore without the need for several hits. It shows that with the bulb according to the invention the ship always has a continuous motion in breaking the pack. As mentioned above, this is a great advantage in manoeuvring operations.

The results of the tests shown in table 4 show the ship's ability to move in the presence of brash ice representing a channel full of ice slabs made by an icebreaker. There is a very precise regulation of the Finnish Swedish Maritime Administration requiring all ships designed for navigation in icy waters to have a minimum rate of at least 5 knots in a thickness of at least 1.3 m of brash ice. Brash ice is broken ice and therefore less demanding than level ice or ridge ice. The test vessel, with an installed power of 14000 kW, used only 3336 kW to meet this standard.

Figure 6:
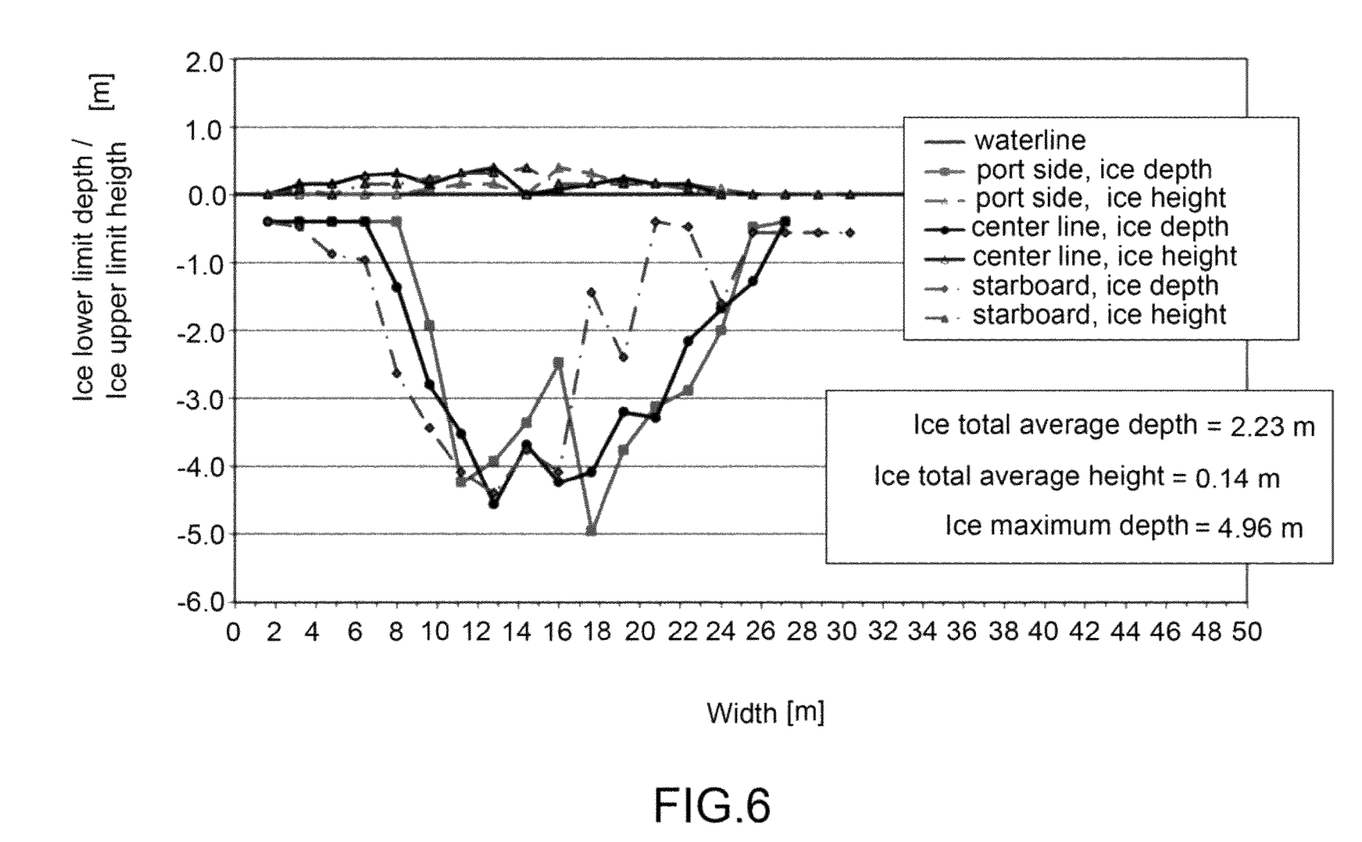
FIG. 6 shows a graph of the crushing capacity of ridge ice by a test ship according to the present invention.

The graphs in FIG. 6 show the thickness value of ridge ice above and below the icy surface at various abscissa values in the direction of advancement of the ship at different distances from the edge of the ice tank in experimental tests, the results of which are shown above.

As already stated above, the effectiveness of the solution according to the invention is not simply related to the shape of the rib and the crushing mechanism, but to the fact that the icebreaker rib is combined with a high-propulsive performance bulb (in particular Delta) and to the bow shapes of the ship in the areas immediately aft of the bulb and which define an inclined groove slanted towards the bottom (or goose neck). Once the ice is broken and raised by the rib, the extension in length of the rib is such that it ends at the beginning of the groove so that the ice immediately aft does not crash against the bow of the ship, but is instantly diverted into the groove defined by the goose neck and dragged under the ship. The invention therefore offers a crushing effect combined with an effect of bringing the crushed ice under the hull where it can flow freely without generating build ups and increasing resistance.

Thanks to the fact that the rib is not continuous with the stem, the ice does not remain attached to the rib, but separates quickly from it.

The tests conducted in the ice tank (especially level type ice) experimentally tested the dynamics of behaviour of the bow bulb with icebreaker rib according to the invention. The ice is effectively crushed by flexing, does not build up on the bow but immediately flows below the hull in an area of clear water where it is dragged away without generating any kind of accumulation at the bow (as may be seen in the sequence of photographs from 15 to 20). The blocks at some point will tend to resurface in the stern area given their lower specific weight (see photos 20 and 21). This behaviour also prevents the propellers from hitting the blocks of ice (see photos 21 and 22).

The invention permits numerous advantages to be obtained, some of which already pointed out above.

The ship for navigation in icy waters according to the invention due to the presence of the bow rib combines superior propulsive performance in free waters (linked to the presence of the high propulsive performance bow bulb, in particular Delta bulb) with excellent manoeuvrability in icy waters. The invention thus makes it possible to use a bow bulb with high propulsive performance in icy waters not only without losing manoeuvrability, but actually increasing in manoeuvrability.

The bulb with rib according to the invention is not simply an ice breaking device, but is a device which crushes and immediately removes the ice from the surface to prevent any accumulation phenomena on the bow of the ship.

The bow bulb with ice breaker rib according to the invention is a device for breaking ice to be used to improve manoeuvring performance in sea waters covered by pack ice. The performance of the crushing device according to the invention makes it possible to classify the ship equipped therewith to ice class 1AS, i.e. the highest class of the Finnish Swedish Maritime Administration for ships that are not ice-breakers.

The invention thus proves an optimal solution for navigation in both open water and icy waters, which allows the ships equipped therewith to operate in complete safety and with low consumption in all areas with even considerably thick seasonal ice without the danger of getting stuck and having to wait for help from ice breakers. Areas with perennial pack ice off trade routes are not included.

The main advantages related to the present invention are listed below:

increased operational range: the bulb with icebreaker rib described allows units performing wintertime services in icy waters to operate up to very high thicknesses of "level ice" (the hardest and most difficult to penetrate) and "ridge ice" without icebreaker support;

no penalization in navigation conditions in ice-free waters: during summertime navigation no propulsive penalty compared to a ship not built for Arctic service, the icebreaker rib having an ultra low resistance;

energy saving: the invention allows use of Delta bulbs and thus a substantially reduction of exhaust emissions in summertime;

increased safety: the bulb with icebreaker rib described provides a value added for ships operating in areas neighbouring the Arctic seas as its application prevents it from getting blocked in the ice.

generalised use: the bulb with icebreaker rib described is a perfect device for all types of ships with dual summer-winter operating profiles in icy waters, such as passenger ships for Antarctic shipping, ferries in the Baltic Sea and all the ships covering Arctic routes to access sites for oil and gas extraction.

The ship according to the invention is therefore operationally reliable.

The bow bulb with ice breaker rib according to the invention does not require complex structural solutions. The ship according to the invention thus provides all the aforesaid benefits without however being significantly more expensive than similar conventional ships.

The invention thus conceived thereby achieves the intended objectives.

Obviously, its practical embodiments may assume forms and configurations different from those described while remaining within the sphere of protection of the invention.

Furthermore, all the parts may be replaced with technically equivalent parts and the dimensions, shapes and materials used may be varied as required.

The invention claimed is:

1. A ship for navigating in icy waters, provided in a bow area with a bulb adapted to generate a bow wave in phase opposition with respect to that generated by a ship hull in such a way that the size of a resulting wave is reduced, thus reducing the ship's resistance, said bulb being connected to the ship hull by a connecting portion which defines a groove inclined downwards towards a stern to convey water under the hull, wherein the ship comprises a rib which frontally protrudes from the bulb on a vertical centreline plane of the bulb and extends from a front end of the bulb to said connecting portion, said rib having at least one front portion arranged below a waterline (WL) of the ship so that, in the case of forward movement in icy waters, the rib engages with such a front portion the ice from below and due to the forward motion of the ship progressively lifts it upwards above the bulb while simultaneously causing the breakage of the ice by bending, the front portion of the rib extending below the waterline (WL) to a depth (H1) predefined according to the maximum thickness of crushable ice, said rib being connected to the connecting portion at the bow of the groove without joining with a stem so as to leave a passage channel free between one side and the other of the bulb at said groove, the rib guiding the ice crushed thereby up to the passage channel in such a way that it is sucked into the groove itself and conveyed under the hull.

2. The ship of claim 1, wherein said rib has a transversal section tapering from the connection base to the bulb towards the top thereof.

3. The ship of claim 1, wherein said rib has a trapezoidal transversal section.

4. The ship of claim 1, wherein at the front end of the bulb, the rib has a concave curvilinear outer profile on the vertical centreline plane of the bulb.

5. The ship of claim 1, wherein on the vertical centreline plane of the bulb, the rib has at least one part with a concave curvilinear profile at least at the front portion of the rib itself arranged below the waterline (WL).

6. The ship of claim 1, wherein the rib extends above the waterline with a rear portion.

7. The ship of claim 6, wherein on the vertical centreline plane of the bulb, the rib has at least one part with rectilinear profile at said rear portion arranged above the waterline (WL).

8. The ship of claim 1, wherein on the vertical centreline plane of the bulb the rib has at least one part with a concave curvilinear profile at least at the front portion of the rib itself arranged below the waterline (WL) and wherein the rib extends above the waterline with a rear portion, on the vertical centreline plane of the bulb the rib having at least one part with rectilinear profile at said rear portion arranged above the waterline (WL), said part with a rectilinear profile of the rear portion of the rib being uninterruptedly connected to the part with concave curvilinear profile of the front portion.

9. The ship of claim 1, wherein on the vertical centreline plane of the bulb, the rib is connected to the connecting portion with a part having a convex curved outer profile.

10. The ship of claim 1, wherein the connecting portion is of the gooseneck type.

11. The ship of claim 1, wherein said groove is inclined downwards towards the stem with respect to the waterline (WL) with an angle between 10° and 25°.

12. The ship of claim 1, wherein the depth ($H_1$) at which the front portion of the rib extends below the waterline (WL) is between 2 to 3 m.

13. The ship of claim 1, wherein the height ($H_2$) to which the rear portion of the rib extends above the waterline (WL) is between 0.8 to 1.2 m.

14. The ship of claim 1, wherein on vertical section planes, the bulb comprises transversal sections shaped as an inverted drop.

15. The ship of claim 1, wherein the bulb has a maximum transversal width on a vertical plane equal to about 12-15% of the ship width.

16. The ship of claim 1, wherein the maximum transversal width of the bulb is located at about $\frac{1}{5}$ of the height of the bulb from an upper edge thereof.

17. The ship of claim 1, wherein the bulb has a transversal section of maximum area located at a distance equal to about $\frac{1}{3}$ of the length of the bulb from the point more at the bow of the longitudinal profile of the bulb itself.

18. The ship of claim 1, wherein the bulb has a length of between 4.0 and 4.4% of the ship length.

19. The ship of claim 1, wherein the bulb has a volume of about 0.5% of the total hull volume.

* * * * *